US012680490B2

(12) United States Patent
Nelson et al.

(10) Patent No.: US 12,680,490 B2
(45) Date of Patent: Jul. 14, 2026

(54) SYSTEMS AND METHODS FOR CONTROLLING TAILPIPE EXHAUST EMISSIONS

(71) Applicant: Cummins Inc., Columbus, IN (US)

(72) Inventors: Thomas R. Nelson, Greenwood, IN (US); David Schmidt, Indianapolis, IN (US); Yuying Song, Columbus, IN (US); Ying Yuan, Rexford, NY (US); Jeffrey Diwakar Abraham, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 19/105,793

(22) PCT Filed: Sep. 20, 2023

(86) PCT No.: PCT/US2023/033280
§ 371 (c)(1),
(2) Date: Feb. 21, 2025

(87) PCT Pub. No.: WO2024/064225
PCT Pub. Date: Feb. 28, 2024

(65) Prior Publication Data
US 2026/0055719 A1     Feb. 26, 2026

Related U.S. Application Data

(60) Provisional application No. 63/408,750, filed on Sep. 21, 2022.

(51) Int. Cl.
F01N 9/00     (2006.01)
B01D 53/94     (2006.01)
(52) U.S. Cl.
CPC ........... F01N 9/00 (2013.01); B01D 53/9459 (2013.01); B01D 53/9495 (2013.01);
(Continued)

(58) Field of Classification Search
CPC .......... F01N 3/20; F01N 3/206; F01N 3/2066; F01N 3/208; F01N 9/00; F01N 11/00;
(Continued)

(56) References Cited

U.S. PATENT DOCUMENTS

| | | | |
|---|---|---|---|
| 5,567,226 | A | 10/1996 | Lookman et al. |
| 6,996,975 | B2 | 2/2006 | Radhamohan et al. |

(Continued)

FOREIGN PATENT DOCUMENTS

| | | |
|---|---|---|
| GB | 2 546 179 B | 8/2020 |
| WO | WO-2015/041830 A1 | 3/2015 |
| WO | WO-2021/092025 A1 | 5/2021 |

OTHER PUBLICATIONS

International Search Report and Written Opinion for International Patent Application No. PCT/US2023/033280, issued Feb. 1, 2024.

*Primary Examiner* — Loren C Edwards
(74) *Attorney, Agent, or Firm* — Foley & Lardner LLP

(57) ABSTRACT

Systems and methods for controlling an aftertreatment system are provided. A method includes: receiving a first input target and a first input value, the first input target and the first input value associated with a first aftertreatment system component; receiving a second input target and a second input value, the second input target and the second input value associated with a second aftertreatment system component; estimating a nitrous oxide value based on at least the first input value and the second input value; determining a first output target based on at least the first input target, the second input target and the nitrous oxide value; and controlling the aftertreatment system based on the first output target.

20 Claims, 9 Drawing Sheets

(52) U.S. Cl.
CPC .... *B01D 2251/208* (2013.01); *F01N 2570/14* (2013.01); *F01N 2610/03* (2013.01); *F01N 2900/1602* (2013.01)

(58) Field of Classification Search
CPC ............. F01N 11/002; F01N 2560/026; F01N 2570/14; F01N 2610/02; F01N 2610/03; F01N 2900/1402; F01N 2900/1602; B01D 53/94–9495; B01D 2251/208; Y02C 20/10; Y02T 10/12; Y02T 10/40
See application file for complete search history.

(56) References Cited

U.S. PATENT DOCUMENTS

| | | | |
|---|---|---|---|
| 7,118,721 B2 | 10/2006 | Rini et al. | |
| 7,166,262 B2 | 1/2007 | Buzanowski | |
| 7,264,785 B2 | 9/2007 | Blakeman et al. | |
| 7,485,272 B2 | 2/2009 | Driscoll et al. | |
| 7,638,107 B1 | 12/2009 | Wirt et al. | |
| 8,108,073 B2 | 1/2012 | Jambhekar et al. | |
| 8,109,077 B2 | 2/2012 | Reba et al. | |
| 8,883,102 B1 * | 11/2014 | Lambert | B01D 53/9418 60/299 |
| 9,616,385 B1 | 4/2017 | Huang et al. | |
| 9,903,247 B2 | 2/2018 | Koshy et al. | |
| 10,954,840 B2 | 3/2021 | El-Gammal et al. | |
| 11,008,917 B2 | 5/2021 | Adelman et al. | |
| 2009/0004083 A1 | 1/2009 | Valentine et al. | |
| 2012/0260634 A1 * | 10/2012 | Devarakonda | F01N 3/208 60/274 |
| 2015/0075143 A1 | 3/2015 | Gong et al. | |
| 2016/0032801 A1 | 2/2016 | Alig et al. | |
| 2021/0087959 A1 | 3/2021 | Kinnaird et al. | |
| 2021/0215079 A1 | 7/2021 | Siddhanthi et al. | |
| 2021/0372310 A1 | 12/2021 | Bare et al. | |

* cited by examiner

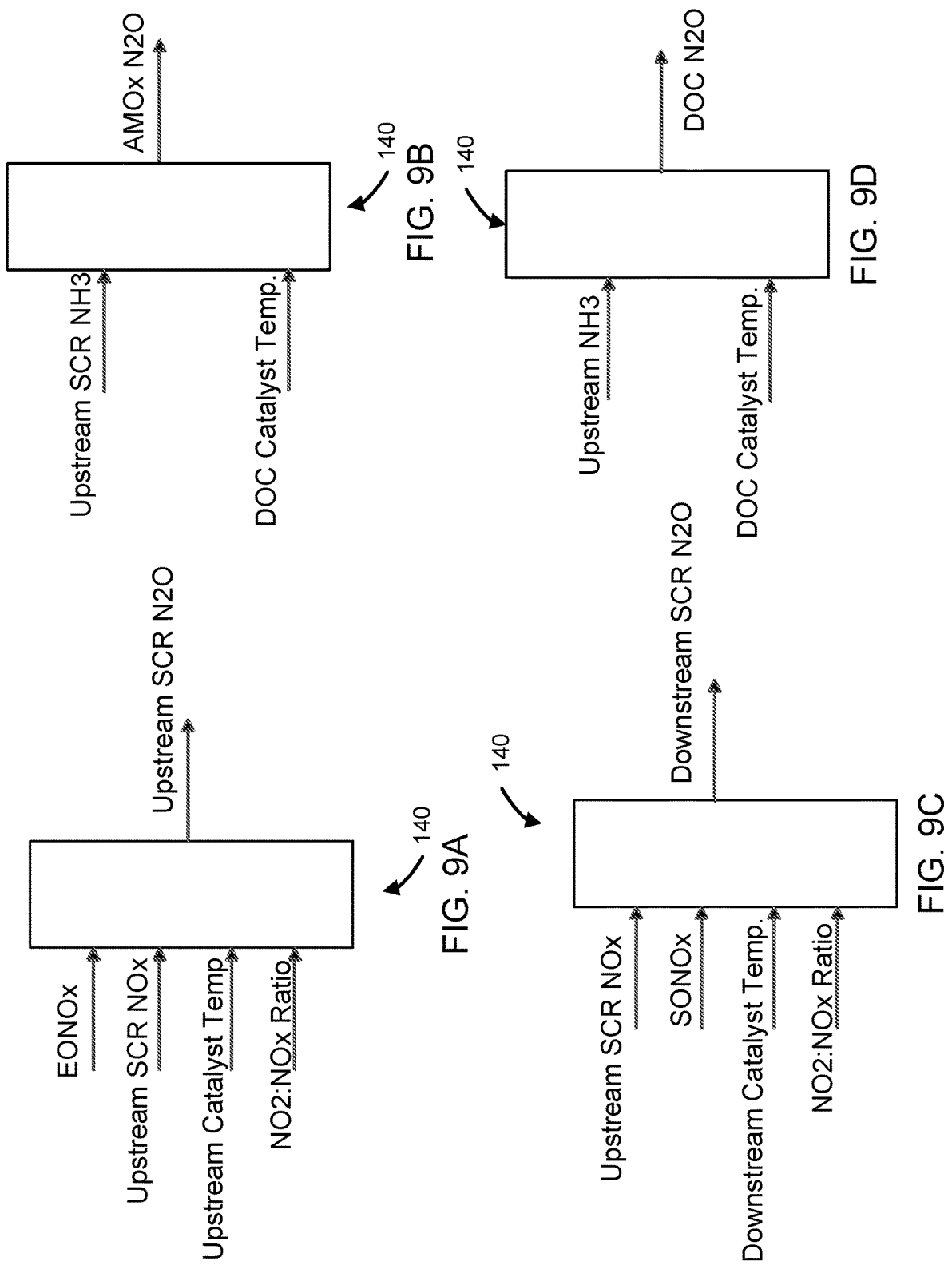

1

SYSTEMS AND METHODS FOR CONTROLLING TAILPIPE EXHAUST EMISSIONS

CROSS-REFERENCE TO RELATED APPLICATIONS

This Application is a U.S. National Stage Application of International Application No. PCT/US2023/033280, filed Sep. 20, 2023, which claims the benefit of and priority to U.S. Provisional Patent Application No. 63/408,750, filed Sep. 21, 2022, both of which are incorporated herein by reference in their entireties and for all purposes.

TECHNICAL FIELD

The present disclosure relates to exhaust aftertreatment systems for vehicles. More particularly, the present disclosure relates to systems and methods for controlling tailpipe exhaust emissions.

BACKGROUND

Many engines are coupled to exhaust aftertreatment systems that reduce harmful exhaust gas emissions (e.g., nitrous oxides (NOx), sulfur oxides, particulate matter, etc.). One or more components of the aftertreatment system may operate within a predetermined operating parameter range, such as a temperature range, a pressure range, etc. For example, a catalyst may convert harmful exhaust gas emissions more effectively within a predetermined temperature range. Additionally a dosing unit may be used to dose exhaust gasses with a dosing fluid. The amount of dosing fluid provided by the dosing unit may impact the conversion of harmful exhaust gas emissions.

SUMMARY

One embodiment relates to a method controlling an aftertreatment system. The method includes: receiving a first input target and a first input value, the first input target and the first input value associated with a first aftertreatment system component; receiving a second input target and a second input value, the second input target and the second input value associated with a second aftertreatment system component; estimating a nitrous oxide value based on at least the first input value and the second input value; determining a first output target based on at least the first input target, the second input target, and the nitrous oxide value; and controlling the aftertreatment system based on the first output target.

Another embodiment relates to a system. The system includes an aftertreatment system including at least a first component and a second component and a controller coupled to the aftertreatment system. The controller includes at least one processor and at least one memory device storing instructions therein that, when executed by the at least one processor, cause the controller to perform operations comprising. The operations include: receiving a first input target and a first input value, the first input target and the first input value associated with the first component; receiving a second input target and a second input value, the second input target and the second input value associated with the second component; receiving a nitrous oxide value based on at least the first input value and the second input value; determining a first output target based on at least the first input target, the second input target and the nitrous oxide value; and controlling the aftertreatment system based on the first output target.

Still another embodiment relates to a non-transitory computer readable medium storing instructions therein that, when executed by one or more processors, cause the one or more processors to perform operations. The operations include: receiving a first input target and a first input value, the first input target and the first input value associated with a first component; receiving a second input target and a second input value, the second input target and the second input value associated with a second component; receiving a nitrous oxide value; determining a first output target based on at least the first input target, the second input target and the nitrous oxide value; and controlling an aftertreatment system based on the first output target.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIGS. 9A-9D are schematic diagrams showing aspects of the controller of FIG. 2, according to an example embodiment.

DETAILED DESCRIPTION

Figure 1:
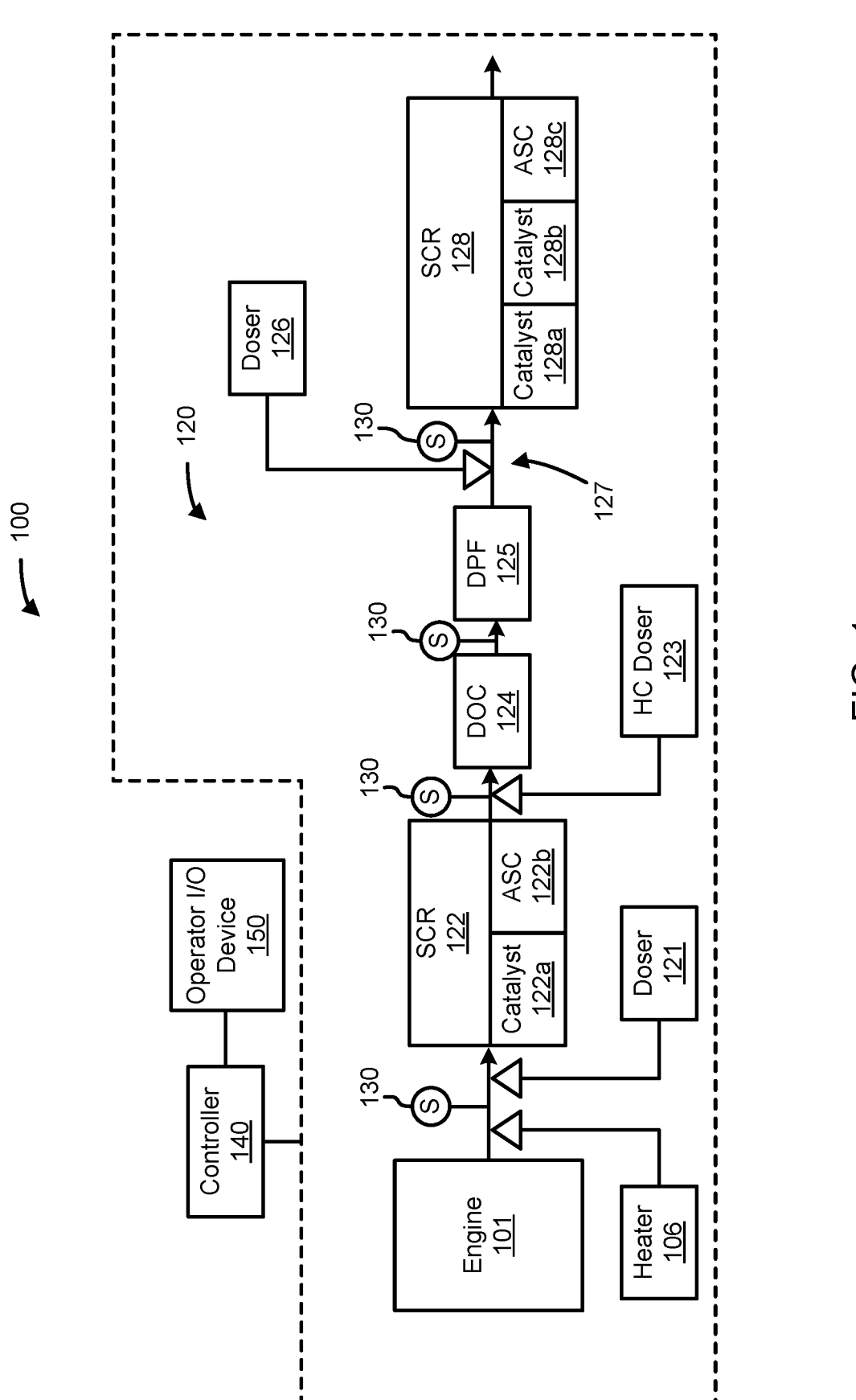
FIG. 1 is a schematic view of a block diagram of a vehicle system, according to an example embodiment.

Following below are more detailed descriptions of various concepts related to, and implementations of, methods, apparatuses, and systems for controlling tailpipe exhaust emissions. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Referring to the Figures generally, the various embodiments disclosed herein relate to systems, apparatuses, and methods for controlling tailpipe exhaust emissions. More particularly, the systems, methods, and apparatuses described herein relate to controlling an aftertreatment system for an internal combustion engine, such as diesel-fueled engine, with multiple reductant (e.g., DEF) dosers and catalysts (e.g., SCR catalysts). As described herein, the systems, methods, and apparatuses described herein include determining NOx and temperature requirements for upstream components, such as a light off SCR or an engine, based on multiple aftertreatment system level constraints including tailpipe NOx, tailpipe N2O and passive regeneration characteristics (e.g., of a diesel particular filter (DPF)). The systems, methods, and apparatuses monitor an impact of reductant dosing on a DPF and use that information in selecting a light off SCR controller target. The systems, methods, and apparatuses also determine if passive regeneration will improve more by increasing temperature compared to increasing NOx. Beneficially, this approach accounts for N2O generated by certain components in the aftertreatment system and determines how to split reductant dosing across multiple SCR systems to meet or attempt to meet tailpipe N2O targets.

An aftertreatment system may include one or more sensors, such as temperature sensors, pressure sensors, flow sensors, etc., to measure exhaust gas parameter values (or receive/acquire information indicative of exhaust gas parameter values), such as temperature values, pressure values, flow rate values, etc., in real-time or near real-time (e.g., every second, every millisecond, every minute, etc.). The aftertreatment system may further include one or more catalysts for reducing certain exhaust gas constituents, such as nitrogen oxides (NOx) or other constituents, and/or one or more dosing modules or units for dosing the exhaust gas with a dosing fluid. At least one controller (e.g., an engine control module (ECM), engine control unit (ECU), other electronic control unit, etc.) for a vehicle includes at least one processor and at least one memory storing instructions that, when executed by the processor, cause the controller to perform various operations. The operations include controlling the aftertreatment system to achieve a target NOx reduction based on certain inputs. Advantageously, the aftertreatment system is controlled to achieve the target NOx reduction for a range of engine operating conditions, including low load and near-idle operation. Furthermore, aftertreatment system is controlled to actively manage byproducts generated by the aftertreatment system, such as nitrous oxide (N2O).

In an example operating scenario, a controller may select a first catalyst target and a second catalyst target based on system level constraints such as a tailpipe NOx target, a tailpipe N2O target, and a passive regeneration likelihood or rate of a particulate filter. Each catalyst manager and particulate filter manager of the controller provides parameter target ranges (e.g., a temperature target range, a NOx target range, etc.). The controller may select a target value that satisfies the parameter target ranges (e.g., a passive soot oxidation, tailpipe N2O target, and a tailpipe NOx target). Furthermore, the controller may control an engine of the vehicle to adjust the engine out NOx (EONOx) or engine out temperature based on determining that the engine output is more impactful than the available aftertreatment system controls.

Technically and beneficially, the systems, methods, and apparatuses described herein provide an improved aftertreatment control system that utilizes vehicle component data, such as target values, target ranges and/or target thresholds of one or more components of an aftertreatment system, to control the operation of the aftertreatment system. Specifically, a target temperature, a target emissions value, and/or a target operating mode may be used to determine a command for controlling the operation of one or more components of the aftertreatment system, such as a dosing unit, such that the operation of the component of the aftertreatment system is optimized to achieve an overall system target output (e.g., a target emissions output of the aftertreatment system).

Referring now to FIG. 1, a system 100 is shown, according to an example embodiment. The system 100 includes an engine 101, an aftertreatment system 120 coupled to the engine, an operator input/output (I/O) device 150, and a controller 140, where the controller 140 is coupled and particularly, communicably coupled, to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, midrange trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 101 may be any type of engine that generates exhaust gas, such as a gasoline, natural gas, diesel engine, a hybrid engine (e.g., a combination of an internal combustion engine and an electric motor), and/or any other suitable engine. In the example depicted, the engine 101 is a diesel-powered compression-ignition engine. In some embodiments, the engine 101 may include one or more engine actuators. The one or more engine actuators are structured to control at least one of an engine idle speed, one or more air flaps for torque and power control, and/or meter fuel to control combustion.

The aftertreatment system 120 is in exhaust-gas receiving communication with the engine 101. The aftertreatment system includes a heater 106, a first dosing module 121 (system, unit, assembly, apparatus, etc.), a first selective catalytic reduction (SCR) system 122, a diesel oxidation catalyst 124, a diesel particulate filter 125, a second dosing module 126 (system, unit, assembly, apparatus, etc.), and a second SCR system 128. The heater 106 is structured to selectively heat the exhaust gas in the aftertreatment system 120. In the embodiment shown in FIG. 1, the heater is coupled to the aftertreatment system 120 downstream of the engine 101 and upstream of the first SCR 122. In other embodiments, the aftertreatment system 120 may include additional heaters and/or the heater 106 may be coupled at a different location of the aftertreatment system 120.

The DOC 124 is structured to receive the exhaust gas from an upstream component and to oxidize hydrocarbons and carbon monoxide in the exhaust gas. The DPF 125 is arranged or positioned downstream of the DOC 124 and structured to remove particulates, such as soot, from exhaust gas flowing in the exhaust gas stream. The DPF 125 includes an inlet, where the exhaust gas is received, and an outlet, where the exhaust gas exits after having particulate matter substantially filtered from the exhaust gas and/or converting the particulate matter into carbon dioxide. In some implementations, the DPF 125 or other components may be omitted. Additionally, although a particular arrangement is shown for the aftertreatment system 120 in FIG. 1, the arrangement of components within the aftertreatment system 120 may be different in other embodiments (e.g., the DPF 125 positioned downstream of the SCR 122 and ASC, one or more components omitted or added, etc.).

The first dosing module 121 and/or the second dosing module 126 are part of a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The first dosing module 121 may inject the reductant upstream of the first SCR 122 (or in particular, a SCR catalyst 122a), such that the SCR catalyst 122a receives a mixture of the reductant and the exhaust gas. Similarly, the second dosing module 126 may inject the reductant upstream of the second SCR 128 (or in particular, a SCR catalyst 128a or a SCR catalyst 128b), such that the SCR catalyst 128a and/or the SCR catalyst 128b receives a mixture of the reductant and the exhaust gas. The reductant droplets then undergo the processes of evaporation, thermo-lysis, and hydrolysis to form gaseous ammonia within the decomposition chamber, the SCR catalyst 122a, 128a, 128b, and/or the exhaust gas conduit system, which leaves the aftertreatment system 120.

The aftertreatment system 120 may further include an oxidation catalyst (e.g., the DOC 124) fluidly coupled to the exhaust gas conduit system to oxidize hydrocarbons and carbon monoxide in the exhaust gas. In order to properly assist in this reduction, the DOC 124 may be required to be at a certain operating temperature. In some embodiments, this certain operating temperature is approximately between 200-500° C. In other embodiments, the certain operating temperature is the temperature at which the conversion efficiency of the DOC 124 exceeds a predefined threshold (e.g., the conversion of HC to less harmful compounds, which is known as the hydrocarbon conversion efficiency). In some embodiments, the aftertreatment system 120 also includes a hydrocarbon (HC) dosing module 123 that injects hydrocarbons upstream of the DOC 124.

The first SCR 122 and/or the second SCR 128 is/are configured to assist in the reduction of NOx emissions by accelerating a NOx reduction process based on the reaction of ammonia and the NOx of the exhaust gas into diatomic nitrogen and water. As shown, the first SCR 122 includes a first catalyst 122a and a first ammonia slip catalyst (ASC) 122b. The second SCR 128 includes a first catalyst 128a, a second catalyst 128b, and a first ammonia slip catalyst (ASC) 128c. In some embodiments, the first SCR 122 may include more or fewer components. For example, the first SCR 122 may include more, fewer, or different catalysts than the first catalyst 122a. In some embodiments, the ASC 122b may be removed from the first SCR 122 (e.g., removed entirely or included in the aftertreatment system 120 separate from the first SCR 122). In some embodiments, the second SCR 128 may include more or fewer components. For example, the second SCR 128 may include more, fewer, or different catalysts than the first catalyst 128a and/or the second catalyst 128b. In some embodiments, the ASC 128c may be removed from the second SCR 128 (e.g., removed entirely or included in the aftertreatment system 120 separate from the second SCR 128). For example, the ASC 122b and/or the ASC 128c is/are not included in the aftertreatment system 120 and/or is/are separate from the first SCR 122 and the second SCR 128. In some embodiments only one of the first SCR 122 or the second SCR 128 includes an ASC. In still other embodiments, the aftertreatment system may include more than two SCR systems, less than two SCR systems, and other configurations.

If the first SCR 122 and/or the second SCR 128 is not at or above a certain temperature, the acceleration of the NOx reduction process is limited and the first SCR 122 and/or the second SCR 128 may not operate at a level of efficiency to meet regulations. In some embodiments, this certain temperature is approximately 200-600° C. The first SCR 122 and/or the second SCR 128 may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.).

When ammonia in the exhaust gas does not react with the first SCR 122 and/or the second SCR 128 (either because the first SCR 122 and/or the second SCR 128 is below operating temperature or because the amount of dosed ammonia greatly exceeds the amount of NOx), the unreacted ammonia may bind to the first SCR 122 and/or the second SCR 128, becoming stored in the first SCR 122 and/or the second SCR 128. This stored ammonia is released from the first SCR 122 and/or the second SCR 128 as the first SCR 122 and/or the second SCR 128 warms, which can cause issues if the amount of ammonia released is greater than the amount of NOx passing through (i.e., more ammonia than needed for the amount of NOx, which can lead to ammonia slip). In some embodiments, the ASC 122b and/or the ASC 128c is included and structured to address ammonia slip by removing at least some excess ammonia from the treated exhaust gas before the treated exhaust flows to a downstream component or is released into the atmosphere. As exhaust gas passes through the ASC 122b and/or the ASC 128c, some of unreacted ammonia (i.e., unreacted with NOx) remaining in the exhaust gas is partially oxidized to NOx, which then consequently reacts with the remaining unreacted ammonia to form N2 gas and water. However, similar to the first SCR 122 and/or the second SCR 128, if the ASC 122b and/or the ASC 128c is not at or above a certain temperature, the acceleration of the NH3 oxidization process is limited and the ASC may not be operating at a level of efficiency to meet regulations or desired parameters. In some embodiments, this certain temperature is approximately 250-300° C.

As shown, a plurality of sensors 130 are included in the aftertreatment system 120. The number, placement, and type of sensors 130 included in the aftertreatment system 120 is shown for example purposes only. That is, in other configurations, the number, placement, and type of sensors may differ. The sensors 130 may be NOx sensors, particulate matter (PM) sensors, other emissions constituent sensors, temperature sensors, flow rate sensors, pressure sensors, some combination thereof, and so on. The NOx sensors are structured to acquire data indicative of a NOx value (e.g., amount, concentration, etc.) at each location that the NOx sensor is located. The PM sensors are structured to acquire data indicative of a PM value (e.g., amount, concentration, etc.) at each location that the PM sensor is located. The temperature sensors are structured to acquire data indicative of a temperature at each location that the temperature sensor is located. The flow rate sensors are structured to acquire data indicative of a flow rate at each location that the flow rate sensor is located. The pressure sensors are structured to acquire data indicative of a pressure at each location that the pressure sensor is located.

The sensors 130 may be located in or proximate the engine 101, after the engine 101 and before the aftertreatment system 120, after the aftertreatment system 120, in the aftertreatment system like as shown (e.g., coupled to the DPF 125 and/or DOC 124, coupled to the first SCR 122, coupled to the second SCR 128, etc.), upstream and/or with the engine 101, etc. It should be understood that the location of the sensors 130 may vary. In one embodiment, there may be sensors 130 located both before and after the aftertreatment system 120. In one embodiment, at least one of the sensors is structured as exhaust gas constituent sensors (e.g., CO, NOx, PM, SOx, etc. sensors). In another embodiment, at least one of the sensors 130 is structured as non-exhaust gas constituent sensors that are used to estimate exhaust gas emissions (e.g., temperature, flow rate, pressure, etc.). Additional sensors may be also included with the system 100. The sensors may include engine-related sensors (e.g., torque sensors, speed sensors, pressure sensors, flowrate sensors, temperature sensors, etc.). The sensors may further sensors associated with other components of the vehicle (e.g., speed sensor of a turbo charger, fuel quantity and injection rate sensor, fuel rail pressure sensor, etc.).

The sensors 130 may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 140 indicative of the speed of the engine 101. When structured as a virtual sensor, at least one input may be used by the controller 140 in an algorithm, model, lookup table, etc. to determine or estimate a parameter of the engine (e.g., power output, etc.). Any of the sensors 130 described herein may be real or virtual.

The controller 140 is communicably coupled to the sensors 130. Accordingly, the controller 140 is structured to receive data from one more of the sensors 130. The received data may be used by the controller 140 to control one more components in the system 100.

Referring still to FIG. 1, an operator input/output (I/O) device 150 is also shown. The operator I/O device 150 may be coupled to the controller 140, such that information may be exchanged between the controller 140 and the I/O device 150, where the information may relate to one or more components of FIG. 1 or determinations (described below) of the controller 140. The operator I/O device 150 enables an operator of the system 100 to communicate with the controller 140 and one or more components of the system 100 of FIG. 1. For example, the operator input/output device 150 may include, but is not limited to, an interactive display, a touchscreen device, one or more buttons and switches, voice command receivers, etc. In this way, the operator input/output device 150 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The controller 140 is structured to control, at least partly, the operation of the system 100 and associated sub-systems, such as the engine 101, the aftertreatment system 120, and the operator input/output (I/O) device 150. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more controllers, such as one or more electronic control units (ECU), transmission control units, powertrain control modules, etc. Thus, the controller may be one or more microcontrollers. While a single controller is shown in the Figures, it should be understood that multiple "controllers" may be implemented/utilized. The controller 140 may be separate from or included with at least one of a transmission control unit, an exhaust aftertreatment control unit, a powertrain control module, an engine control module, etc.

Figure 2:
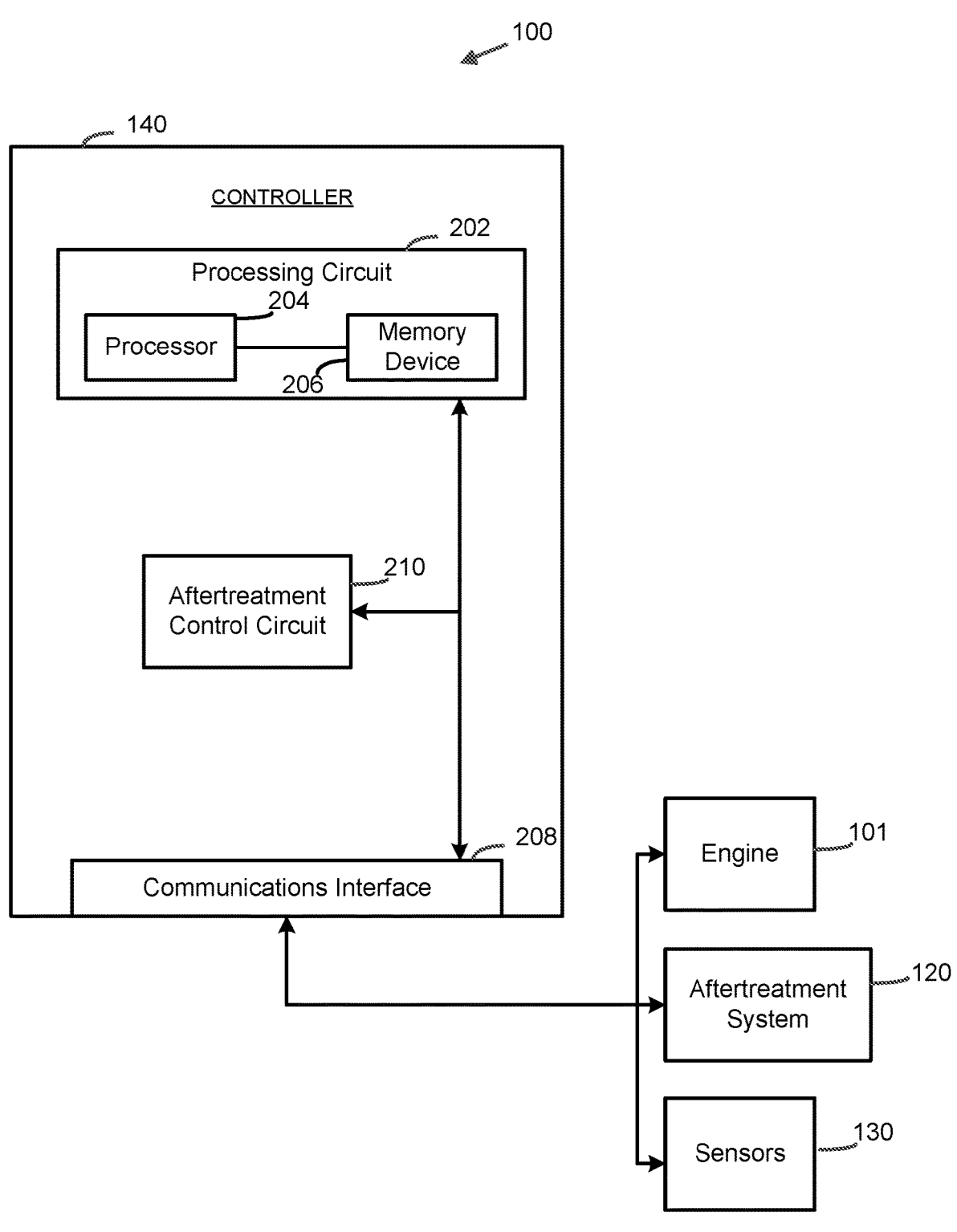
FIG. 2 is a block diagram of the controller of FIG. 1, according to an example embodiment.

Referring now to FIG. 2, a schematic diagram of the controller 140 of the system 100 of FIG. 1 is shown according to an example embodiment. As shown in FIG. 2, the controller 140 includes a processing circuit 202 having a processor 204 and a memory device 206, an aftertreatment control circuit 210, and a communications interface 208. As described herein, the controller 140 is structured to control the aftertreatment system 120 based on one or more inputs including target values, sensor data, and/or other inputs.

In one configuration, the aftertreatment control circuit 210 is embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be executed on one processor or multiple remote processors. In the latter scenario, the remote processors may be connected to each other through any type of network (e.g., CAN bus, etc.).

In another configuration, the aftertreatment control circuit 210 is embodied as a hardware unit, such as an electronic control unit. As such, the aftertreatment control circuit 210 may be embodied as one or more circuitry components including, but not limited to, processing circuitry, network interfaces, peripheral devices, input devices, output devices, sensors, etc. In some embodiments, the aftertreatment control circuit 210 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the aftertreatment control circuit 210 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The aftertreatment control circuit 210 may also include programmable hardware devices such as field programmable gate arrays, programmable array logic, programmable logic devices or the like. The aftertreatment control circuit 210 may include one or more memory devices for storing instructions that are executable by the processor(s) of the aftertreatment control circuit 210. The one or more memory devices and processor(s) may have the same definition as provided below with respect to the memory device 206 and processor 204. In some hardware unit configurations, the aftertreatment control circuit 210 may be geographically dispersed throughout separate locations in the vehicle. Alternatively and as shown, the aftertreatment control circuit 210 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the aftertreatment control circuit 210. The depicted configuration represents the aftertreatment control circuit 210 as machine or computer-readable media storing instructions. However, as mentioned above, this illustration is not meant to be limiting as the present disclosure contemplates other embodiments where the aftertreatment control circuit 210, or at least one circuit thereof, is configured as a hardware unit. All such combinations and variations are intended to fall within the scope of the present disclosure.

The processor 204 may be implemented as at least one suitable processor, such as a single- or multi-chip processor, a digital signal processor (DSP), an application specific integrated circuit (ASIC), a field programmable gate array (FPGA), or other programmable logic device, discrete gate or transistor logic, discrete hardware components, and/or any combination thereof designed to perform at least some of the functions described herein. A processor may be a processor, a microprocessor, a group of processors, etc. A processor also may be implemented as a combination of computing devices, such as a combination of a DSP and a microprocessor, a plurality of microprocessors, one or more microprocessors in conjunction with a DSP core, or any other such suitable configuration. Thus, the one or more processors may take the form of a single core processor, multi-core processor (e.g., a dual core processor, triple core processor, quad core processor, etc.), and so on. In some embodiments, the one or more processors may be shared by multiple circuits (e.g., the aftertreatment control circuit 210 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device

206 may be or include tangible, non-transient volatile memory or non-volatile memory. Accordingly, the memory device 206 may include database components, object code components, script components, or any other type of information structure for supporting the various activities and information structures described herein.

The communications interface 208 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example, and regarding out-of-vehicle/system communications, the communications interface 208 may include an Ethernet card and port for sending and receiving data via an Ethernet-based communications network and/or a Wi-Fi transceiver for communicating via a wireless communications network. The communications interface 208 may be structured to communicate via local area networks or wide area networks (e.g., the Internet) and may use a variety of communications protocols (e.g., IP, LON, Bluetooth, ZigBee, radio, cellular, near field communication).

The aftertreatment control circuit 210 is structured to control the operation of the engine system (e.g., the engine 101 and/or the aftertreatment system 120, or components/systems thereof) based on one or more inputs, such as a user input, a target range, a target value, a third-party target range or value (e.g., a restriction or target set by a third-party, such as a regulatory body, a government agency, etc.), sensor data (e.g., data from the sensors 130), and/or other inputs. Accordingly, in some embodiments, the aftertreatment control circuit 210 may be structured to receive inputs (e.g., via, the sensors 130, the operator I/O device 150, the communications interface 208). In some embodiments, the aftertreatment control circuit 210 may be structured to control the operation of the sensors 130. For example, the aftertreatment control circuit 210 may be structured to generate one or more control signals and transmit the control signals to one or more sensors 130 (e.g., to acquire data, etc.). The control signals may cause the one or more sensors 130 to sense and/or detect the sensor data and/or provide the sensor data to the aftertreatment control circuit 210. In some embodiments, the aftertreatment control circuit 210 may be structured to estimate the sensor data (e.g., when the sensors 130 are virtual sensors). In any of these embodiments the sensor data may include exhaust gas constituent data (e.g., a value, a concentration, etc. of one or more exhaust gas constituents), temperature data, flow rate data, pressure data, and/or other data related to the operation of the aftertreatment system 120. The aftertreatment control circuit 210 is also structured to receive the sensor data and provide the sensor data to the other components of the controller 140, such as the processing circuit 202.

The aftertreatment control circuit 210 may control the aftertreatment system 120 and/or one or one components thereof, such as the first dosing module 121 and/or the second dosing module 126, based on the received inputs. In an example embodiment, the aftertreatment control circuit 210 is structured to generate a control command for controlling the aftertreatment system 120 and/or one or one components thereof. For example, the aftertreatment control circuit 210 may analyze the one or more inputs to determine one or more aftertreatment system outputs that satisfy one or more constraints. In some embodiments, the aftertreatment control circuit 210 may be further structured to control the operation of the engine 101. For example, the aftertreatment control circuit 210 may analyze the one or more inputs to determine one or more engine outputs that satisfy one or more constraints.

In any of the above described embodiments, the inputs may include one or more temperature values, such as a temperature of a component of the aftertreatment system 120 (e.g., a temperature of the DOC 124, the DPF 125, the first SCR 122 and/or the second SCR 128) and/or a temperature of an exhaust gas flowing out of the engine 101 and through the aftertreatment system 120 at one or more locations (e.g., at a location upstream the aftertreatment system 120, within the aftertreatment system 120, or downstream the aftertreatment system 120). The inputs may further include one or more pressure values, such as a pressure change across a component of the aftertreatment system 120 (e.g., a difference between a pressure downstream of the component and a pressure upstream of the component). The inputs may further include one or more target values or ranges, such as a target NOx value or target NOx range. The target values or ranges may be specific to a location within the aftertreatment system 120, such as an aftertreatment system inlet (e.g., an engine exhaust outlet), an inlet of the first SCR 122, an outlet of the first SCR 122, an inlet of the second SCR 128, an outlet of the second SCR 128, an outlet of the aftertreatment system 120 (e.g., a tailpipe), and/or inlets or outlets of other components of the aftertreatment system 120. Further examples of the received inputs and the controls are described in further detail herein with respect to FIGS. 3-5.

Figure 3:
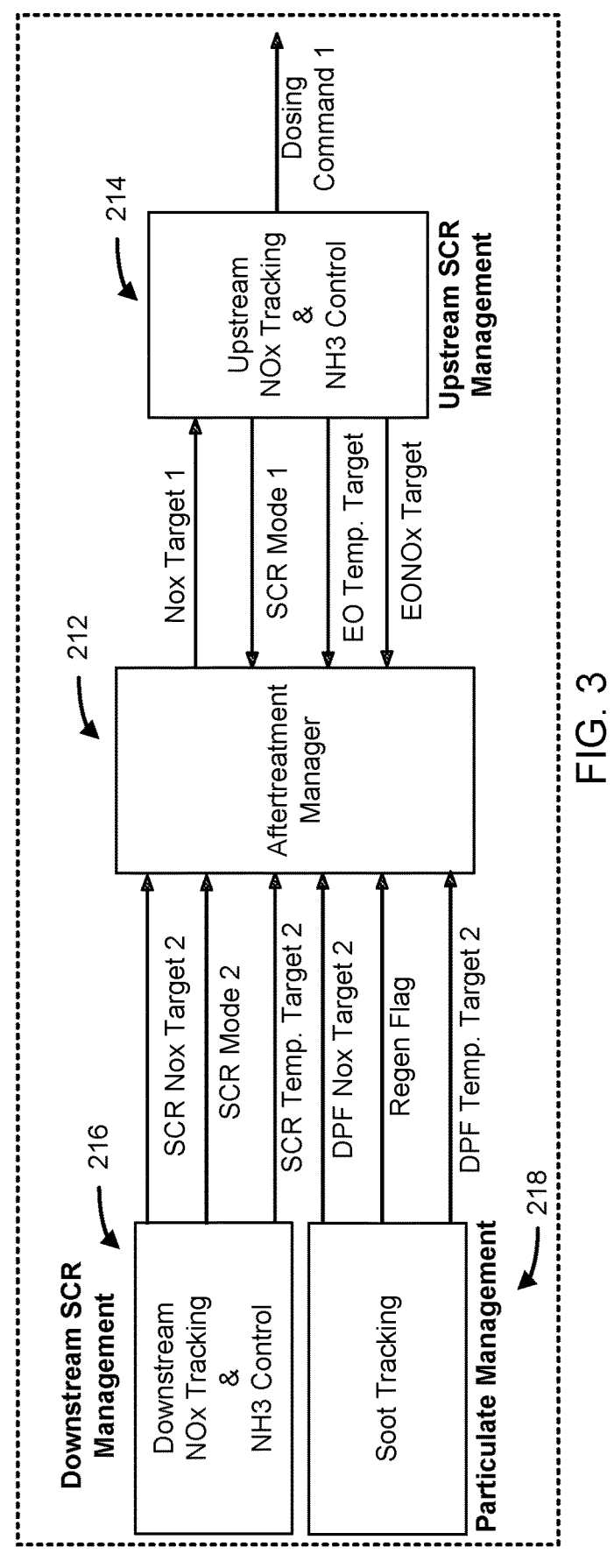
FIG. 3 is a schematic diagram showing aspects of the controller of FIG. 2, according to an example embodiment.

Now referring to FIG. 3, a schematic diagram showing aspects of the aftertreatment control circuit 210 are shown, according to an example embodiment. As shown in FIG. 3, the aftertreatment control circuit 210 may include one or more sub-components shown as an aftertreatment manager 212, an upstream SCR manager 214, a downstream SCR manager 216, and a particulate manager 218. Similar to the aftertreatment control circuit 210 described above with respect to FIG. 2, the sub-components of the aftertreatment control circuit 210 may be embodied as software, hardware units, or a combination thereof. In other embodiments, one or more of the upstream SCR manager 214, the downstream SCR manager 216, and the particulate manager 218 is communicatively coupled to the aftertreatment control circuit 210 and separate from the aftertreatment control circuit 210.

In the embodiment shown, the aftertreatment manager 212 receives upstream SCR data from the upstream SCR manager 214, downstream SCR data from the downstream SCR manager 216, and particulate filter data from the particulate manager 218. In some embodiments, one or more of the upstream SCR data, the downstream SCR data or the particulate filter data may be stored by the memory device 206 and retrieved by one or more components of the controller 140, such as the aftertreatment control circuit 210. The upstream SCR data may be associated with a first aftertreatment system component (e.g., the first SCR 122). The upstream SCR data may include one or more first input targets and/or one or more first input values. For example, the upstream SCR data may include a first SCR mode, an engine out temperature target, and an EONOx target. The first SCR mode may include a normal operating mode, an ammonia slip control mode, or a predictive ammonia slip control mode.

In the ammonia slip control mode, the aftertreatment manager 212 controls the aftertreatment system 120 to reduce ammonia slip (e.g., when ammonia passes through the upstream SCR 122 and/or the downstream SCR 128 unreacted and eventually is released/emitted into the environment). In some embodiments, the aftertreatment manager 212 may adjust an amount of ammonia in the aftertreatment system (e.g., by increasing or decreasing an amount of reductant supplied by the first dosing module 121 and/or the second dosing module 126), adjusting a temperature of the exhaust gas flowing through the exhaust aftertreatment system 120, and/or increase a temperature of a component of the aftertreatment system 120 (e.g., by activating or deactivating the heater 106 and/or causing the engine 101 to increase or decrease an engine output temperature).

In the predictive ammonia slip control mode, the aftertreatment manager 212 controls the aftertreatment system 120 to prevent or substantially prevent a predicted ammonia slip event (i.e., mitigate against ammonia slip that is likely to occur within a predefined amount of time or distance based on various operating conditions). The controller 140 may predict an upcoming ammonia slip event based on the temperature of the exhaust gas flowing through the exhaust aftertreatment system 120, the temperature of a component of the aftertreatment system 120 being outside a temperature range (e.g., above a maximum temperature threshold and/or below a minimum temperature threshold), and/or based on an amount of reductant supplied by the first dosing module 121 and/or the second dosing module 126 compared to a NOx value (e.g., a NOx value (e.g., an amount, rate, etc.) measured or determined at an upstream side of the upstream SCR 122 and/or the downstream SCR 128). For example, the controller 140 may anticipate an ammonia slip event based on a change in temperature of the exhaust gas at the inlet of the aftertreatment system 120. The controller 140 may cause the first dosing module 121 and/or the second dosing module 126 to adjust a dosing value (e.g., a dosing amount, frequency, etc.). As described herein, the controller 140 may operate the upstream SCR independently of the downstream SCR. In an example embodiment, if the controller 140 anticipates an ammonia slip event (i.e., an unreacted ammonia amount that exceeds a predefined threshold amount) based on an increase in temperature of the exhaust gas at the inlet of the aftertreatment system 120 (or another indicator, such as via a trend indicating an increase in emitted NOx emissions), the controller 140 may cause the first dosing module 121 to decrease the dosing value to reduce the ammonia stored at or near the upstream SCR 122. The decreased ammonia in the upstream SCR 122 causes more NOx to flow to the downstream SCR 128. Further, the predicted or determined ammonia slip event may also impact or drive engine out NOx changes through EONOx target ranges. This may reduce ammonia slip downstream instead of NOx downstream. In addition, an ammonia slip event (predicted or detected) may increase engine out NOx with a corresponding reduction in dosing on an upstream SCR to reduce overall ammonia slip. A similar mechanism is used in reducing urea dosing to increase NOx out of upstream SCR when ammonia slip is predicted/detected in a downstream SCR (two-SCR system).

The engine out target temperature is a target range for the engine output temperature. The target range for the engine output temperature may be based on one or more current engine operating parameters (e.g., a current engine speed, a current engine load, etc.). In some embodiments, the EONOx target is a target range for the engine output NOx value. The target range for the EONOx may be based on a current aftertreatment operating parameter (e.g., which may include a NOx conversion efficiency, an NH3 slip value, a DPF soot loading value, and/or other aftertreatment system operating parameters). In other embodiments, the EONOx target is a threshold EONOx value that defines a maximum EONOx value that the actual EONOx value is attempted to be kept at or below. In any of these embodiments, the EONOx target may be determined based on one or more operating conditions such as a steady state operating condition or a transient operating condition (e.g., traveling uphill, traveling downhill, loads above a predefined amount for less than a predefined amount, etc.). The actual EONOx value may be a NOx value received from an engine exhaust NOx sensor 130.

The downstream SCR data may be associated with a second aftertreatment system component (e.g., the second SCR 128). The upstream SCR data may include one or more first input targets and/or one or more first input values. For example, the upstream SCR data may include a second SCR mode, a downstream SCR NOx target, and a downstream SCR temperature target. In some embodiments, the downstream SCR NOx target is a target range for the NOx value at the inlet of the second SCR 128. The range for the downstream SCR NOx target may be based on a NOx conversion efficiency of the first SCR 122. In other embodiments, the SCR NOx target is a threshold SCR NOx threshold that defines a maximum SCR NOx value that the actual SCR NOx value is kept at or attempted to be kept at or below. In any of these embodiments, the SCR NOx target may be determined based on one or more operating conditions such as a steady state operating condition or a transient operating condition (e.g., traveling uphill, traveling downhill, and/or other momentary excursions of the system that last for less than a predefined amount of time and that correspond with changes in operating conditions, such as torque and/or speed, above predefined amounts to indicate a transient condition). The actual SCR NOx value may be a NOx value received from an SCR NOx sensor 130. In some embodiments, the downstream SCR temperature target is a target range for the temperature value at the inlet of the second SCR 128. The range for the downstream SCR temperature target may be based on a temperature range at which the second SCR 128 reduces NOx at a desired rate. In other embodiments, the SCR temperature target is a threshold SCR temperature threshold that defines a maximum SCR temperature value that the actual SCR temperature value is kept at or attempted to be kept at or below. In yet other embodiments, the SCR temperature target is a minimum temperature target threshold (or a desired range of temperatures) for the SCR to promote NOx reduction activity by the catalyst. In any of these embodiments, the SCR temperature target may be determined based on one or more operating conditions such as a steady state operating condition or a transient operating condition (e.g., traveling uphill, traveling downhill, etc.). The actual SCR temperature value may be a temperature value received from an SCR temperature sensor 130.

The particulate filter data may be associated with the DPF 125. The particulate filter SCR data may include a DPF temperature target and an indication of whether the DPF needs to be regenerated or is likely to be regenerated passively. Passive regeneration results from operating the engine system while "active" regeneration results from specific commands (e.g., turning on the heater at full or nearly full power and running the engine at high speed and torque values to elevate exhaust temperatures). In either case, during regeneration, particulate matter, like soot, ash, etc., is burned off of the DPF to restore or regenerate operability of the DPF. In some embodiments, the particulate filter data may include an indication of whether dosing, heating (via the heater), and/or other commands (e.g., increased engine power output to increase exhaust gas temperatures to cause regeneration) are likely to cause passive regeneration. The particulate filter NOx target is a target range for the NOx value at the inlet of the DPF 125. A likelihood of passive regeneration may be continuously calculated based on a temperature of the DOC and DPF, exhaust flow, engine out PM, and current soot loading of the DPF. The aftertreatment manager 212 (or more specifically, the target generation circuit 304) may use these values to calculate NOx targets and temperature targets to meet a passive regeneration target (i.e., temperatures above a predefined threshold that are likely to cause regeneration). The range for the particulate filter NOx target may be based on a NOx conversion efficiency of the first SCR 122. The particulate filter temperature target is a target range for the temperature value at the inlet of the DPF 125. The range for the particulate filter temperature target may be based on a temperature range for active and/or passive regeneration of the DPF 125 (e.g., a temperature at which soot will burn off of the DPF 125). The indication of whether the DPF needs to be regenerated may be based on an amount of soot on the DPF 125 which may be detected or estimated by the sensors 130. For example, by measuring or otherwise determining a pressure change or differential across the DPF 125 using the sensors 130, the controller 140 may determine that the DPF 125 needs regeneration if the pressure change is above a threshold value.

In any of these embodiments, the "target" may be a target value (e.g., a particular value which may or may not include an error, such as plus or minus 5%, 10%, etc.) or a target range (e.g., a maximum value and a minimum value).

In the embodiment shown, the aftertreatment manager 212 is configured to output an upstream NOx target. The upstream NOx target may include a NOx target value for the first SCR 122. In some embodiments, the upstream NOx target may include a NOx target value for an outlet of the first SCR 122. The aftertreatment manager 212 may provide the upstream NOx target to the upstream SCR manager 214. The upstream SCR manager 214 may be configured to output a first dosing command (e.g., to the first dosing module 121) based, at least partly, on the upstream NOx target. In an example operating scenario, the controller 140 (or a component thereof, such as the aftertreatment control circuit 210) may determine a first dosing command to change (e.g., increase and/or decrease) a dosing parameter (e.g., a dosing amount, frequency, timing of dosing/injection) based on the above-described inputs. In some embodiments, when the aftertreatment control circuit is configured to control the engine 101, the outputs may additionally and/or alternatively include an engine out temperature command and/or an EONOx command.

In an example embodiment, the first dosing command may be provided to the first dosing module 121 and/or the second dosing module 126. In some embodiments the first dosing command may include one or more control parameters for the first dosing module 121 and/or the second dosing module 126, such as a dosing amount, a dosing concentration, a dosing timing, etc.

Figure 4:
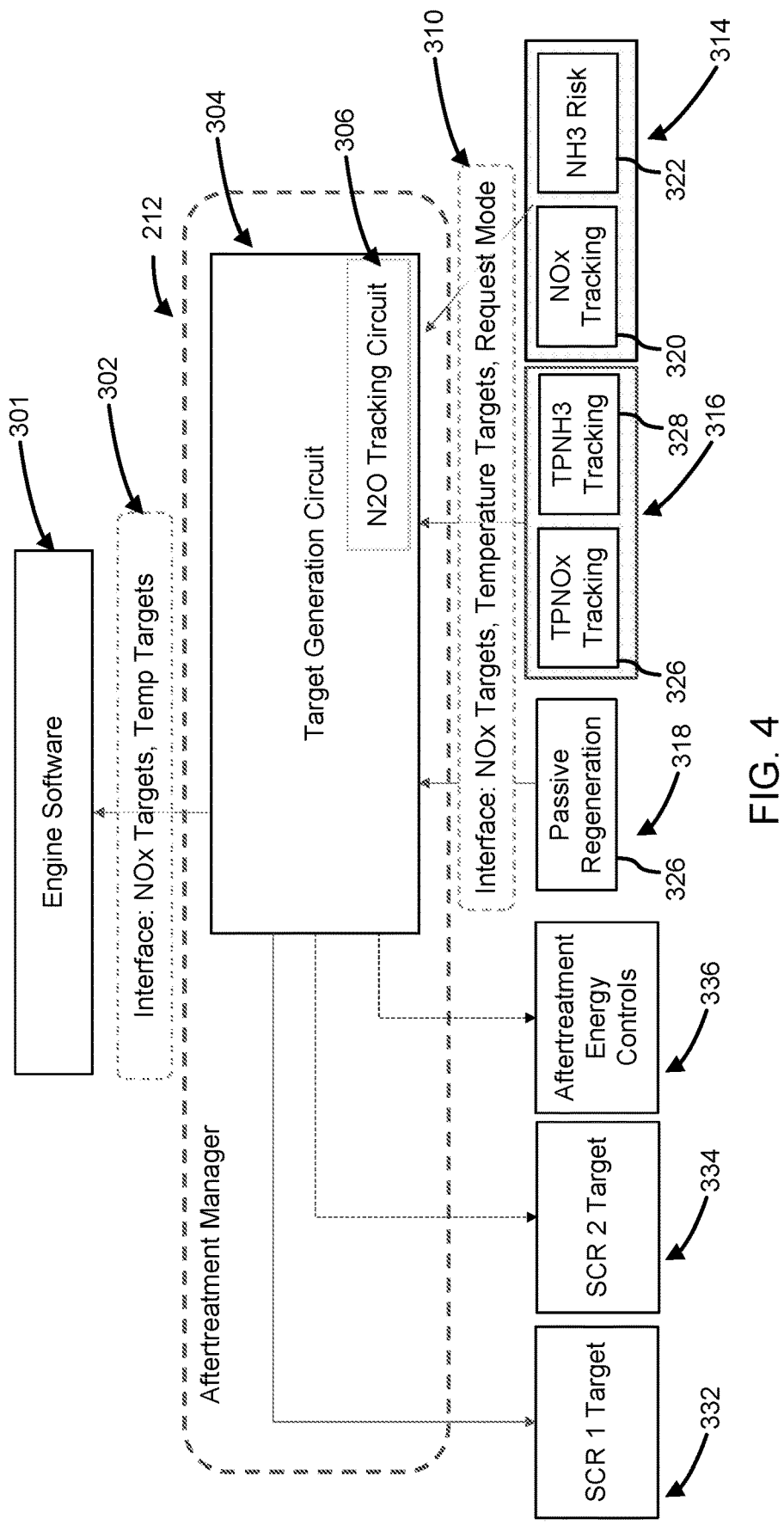
FIG. 4 is a schematic diagram showing aspects of the controller of FIG. 2, according to an example embodiment.

Now referring to FIG. 4, a schematic diagram showing aspects of the aftertreatment control circuit 210, according to an example embodiment. In particular, a schematic diagram of the aftertreatment manager 212 is shown, according to an example embodiment. As described above the aftertreatment manager 212 is part of the aftertreatment control circuit 210. In the embodiment shown, the aftertreatment manager 212 may receive aftertreatment system inputs via an aftertreatment system interface 310. The aftertreatment system inputs may include inputs from an upstream SCR manager 314, a downstream SCR manager 316, and/or a particulate manager 318. As shown the aftertreatment manager 212 includes a target generation circuit 304 that is configured to dynamically generate one or more control signals for controlling the aftertreatment system 120 based on aftertreatment system constraints (e.g., target ranges, values, thresholds, etc. received as inputs).

The target generation circuit 304 may be embodied as software, a hardware unit, or any combination thereof as described herein (e.g., as a processing circuit). As shown, the target generation circuit 304 may be configured for $N_2O$ tracking, shown as a $N_2O$ tracking circuit 306. The $N_2O$ tracking circuit 306 may monitor the amount of $N_2O$ within the aftertreatment system 120 (e.g., by detecting and/or estimating an $N_2O$ value by the sensors 130). Examples for determining the N2O values are described herein with respect to FIG. 9. In some embodiments, the aftertreatment manager 212 receives information regarding the $N_2O$ (e.g., within the aftertreatment system 120) from the target generation circuit 304. In some embodiments, the information regarding the $N_2O$ includes a $N_2O$ value. In some embodiments, the $N_2O$ value is an estimated $N_2O$ value that is based on one or more input values described herein with respect to FIG. 9. In some embodiments, the estimated $N_2O$ value is a first estimated $N_2O$ value at or proximate the first SCR 122. In some embodiments, the estimated $N_2O$ value is a second estimated $N_2O$ value at or proximate the second SCR 128.

The aftertreatment system interface 310 enables the aftertreatment control circuit 210 and/or a component thereof (e.g., the aftertreatment manager 212) to receive the aftertreatment data including NOx targets, temperature targets, SCR mode change requests, etc. More specifically, the aftertreatment manager 212 may receive upstream SCR data associated with the first SCR 122 from the upstream SCR manager 314. The upstream SCR data may include NOx tracking data 320 and $NH_3$ data 322. The NOx tracking data 320 may include one or more NOx values at an inlet and/or at an outlet of the first SCR 122. The one or more NOx values may be measured and/or estimated by the sensors 130. The $NH_3$ data 322 may include one or more $NH_3$ values associated with the first SCR 122. The one or more $NH_3$ values may be estimated by the sensors 130. For example, the sensors 130 may be virtual sensors that are configured to estimate a current value of $NH_3$ at the inlet and/or the outlet of the first SCR 122.

The aftertreatment manager 212 may receive downstream SCR data associated with the second SCR 128 from the downstream SCR manager 316. The downstream SCR data may include tailpipe NOx (TPNOx) tracking data 326 and $NH_3$ tracking data 322. The NOx tracking data 326 may include one or more NOx values at an inlet and/or at an outlet of the second SCR 128. The one or more NOx values may be measured and/or estimated by the sensors 130. The $NH_3$ tracking data 322 may include one or more $NH_3$ values associated with the second SCR 128. The one or more $NH_3$ values may be measured and/or estimated by the sensors 130.

The aftertreatment manager 212 may receive particulate filter data associated with the DPF 125 from the particulate manager 318. The particulate filter data may include an indication of whether the DPF 125 requires regeneration. In some embodiments, the particulate manager 318 may determine whether regeneration is required based on a pressure drop across the DPF 125, a time since a last regeneration, or a combination thereof.

The aftertreatment manager 212 is configured to output a first SCR target 332, a second SCR target 334, and an aftertreatment energy command 336. The first SCR target 332 may be determined based on one or more of the inputs described herein and/or an $N_2O$ tracking value. The first SCR target 332 may include one or more commands for controlling the operation of the first dosing module 121. For example, the first SCR target 332 may include a command to change (e.g., increase and/or decrease) the amount of reductant injected into the aftertreatment system by the first dosing module 121. The second SCR target 334 may be determined based on one or more of the inputs described herein and/or an $N_2O$ tracking value. The second SCR target 334 may include one or more commands for controlling the operation of the second dosing module 126. For example, the second SCR target 334 may include a command to change (e.g., increase and/or decrease) the amount of reductant injected into the aftertreatment system by the second dosing module 126. The aftertreatment energy command 336 may include controlling the heater 106 to adjust the temperature of the exhaust gas at the inlet of the aftertreatment system 120. For example, the controller 140 may determine, based on a target temperature for one or more components of the aftertreatment system 120, a target temperature for the exhaust gas at the inlet of the aftertreatment system 120 (or of one or more aftertreatment system components, such as a SCR catalyst). The controller 140 may output the aftertreatment energy command 336 to control the heater 106 (or, in some embodiments, a heater command or a hydrocarbon doser) based on the target temperature of the exhaust gas at the inlet of the aftertreatment system 120.

As briefly described above, the aftertreatment control circuit 210 or a component there of, such as the aftertreatment manager 212, may be communicatively coupled to the engine 101. More specifically, and as shown in FIG. 4, the aftertreatment manager 212 may interface with an engine software 301 via an engine interface 302. The engine software may include software for controlling the engine 101. The aftertreatment control circuit 210 may be configured to control the operation of the engine 101 via the engine software 301. The engine interface 302 may enable the aftertreatment control circuit 210 to receive engine data including a NOx target and/or a temperature target for the engine 101 from the engine software 301. The engine interface 302 may further enable the aftertreatment control circuit 210 to send an engine command to the engine software 301 (or, alternatively, directly to the engine 101). The engine command may include one or more of an EONOx target value and/or an engine out temperature value.

Figure 5:
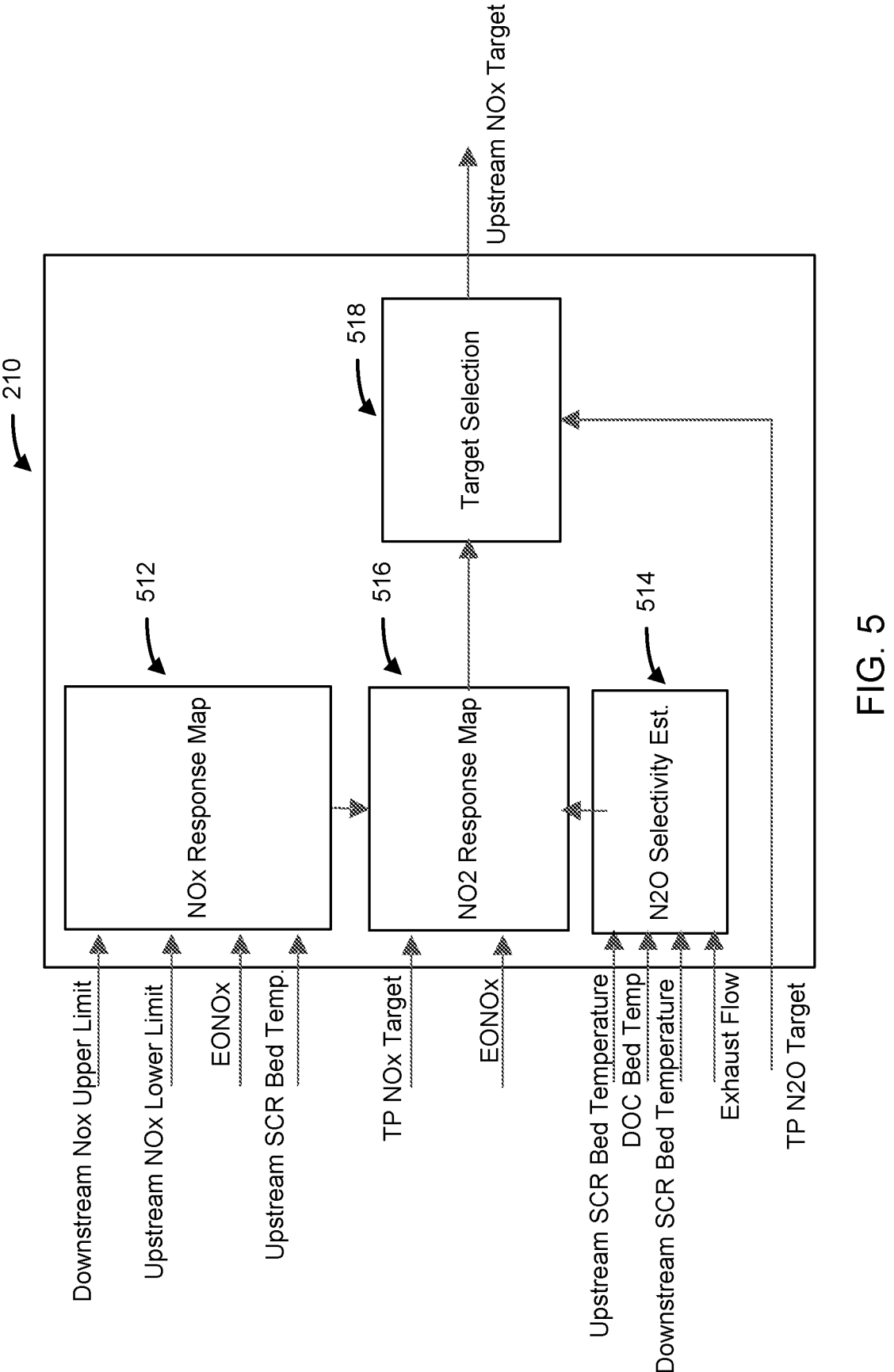
FIG. 5 is a schematic diagram showing aspects of the controller of FIG. 2, according to an example embodiment.

Now referring to FIG. 5, a schematic diagram showing aspects of the aftertreatment control circuit 210 are shown, according to an example embodiment. In the embodiment shown, the aftertreatment control circuit 210 may include one or more sub-components shown as a NOx response map 512, a N2O selectivity estimation 514, an NO2 response map 516, and a target selection 518. Similar to the aftertreatment control circuit 210 described above with respect to FIG. 2, the sub-components of the aftertreatment control circuit 210 may be embodied as software, hardware units (i.e., separate controllers coupled via a controller area network to form, at least partly, the aftertreatment control circuit 210), or a combination thereof. In other embodiments, one or more of the NOx response map 512, the N2O selectivity estimation 514, the NO2 response map 516, and the target selection 518 is communicatively coupled to the aftertreatment control circuit 210 and separate from the aftertreatment control circuit 210.

The NOx response map 512 may be a lookup table, model structure, or other data array that correlates inputs to a range of NOx values. The controller 140 (or a component there of, such as the aftertreatment control circuit 210) may selectively retrieve the response map 512 (e.g., from the memory device 206) and utilize the response map 512 to determine one or more outputs. For example, the NOx response map 512 may receive a first set of inputs including a downstream NOx upper limit, a downstream NOx lower limit, an EONOx value, and an upstream SCR bed temperature. Based on the inputs, the NOx response map 512 limits the range of NOx values. In some embodiments, the controller 140 may receive the range of NOx values.

The N2O selectivity estimation 514 is at least one of a lookup table, a statistical model (e.g., a regression model), or data array that estimates an amount of N2O generated by the aftertreatment system based on one or more inputs. The controller 140 (or a component there of, such as the aftertreatment control circuit 210) may selectively retrieve the N2O selectivity estimation 514 (e.g., from the memory device 206) and utilize the N2O selectivity estimation 514 to determine one or more outputs. For example, the N2O selectivity estimation 514 receives a second set of inputs including an upstream SCR bed temperature, a DOC bed temperature, a downstream SCR bed temperature, and an exhaust flow value (e.g., exhaust flow rate). The N2O selectivity estimation 514 estimates an amount of N2O generated by the aftertreatment system 120. In some embodiments, the controller 140 may receive the estimated N2O value.

The N2O response 516 map may be a lookup table, model structure, or other data array that correlates inputs to a range of N2O values. The controller 140 (or a component there of, such as the aftertreatment control circuit 210) may selectively retrieve N2O response 516 (e.g., from the memory device 206) and utilize the N2O response 516 to determine one or more outputs. The N2O response map 516 receives a third set of inputs including a tailpipe NOx (TPNOx) target, an EONOx value, the NOx range from the NOx response map 512, and the estimated N2O from the N2O selectivity estimation 514. Based on the inputs, the N2O response map 516 limits the range of N2O values using at least one of a lookup table or a statistical model (e.g., a regression model). In some embodiments, the controller 140 may receive the N2O range. The target selection 518 receives inputs of a tailpipe N2O (TPN2O) target and the range of N2O values from the N2O response map 516. The target selection 518 determines an upstream NOx target based on the inputs. In some embodiments, the controller 140 may receive the upstream NOx target.

Figures 6A, 6B, 6C:
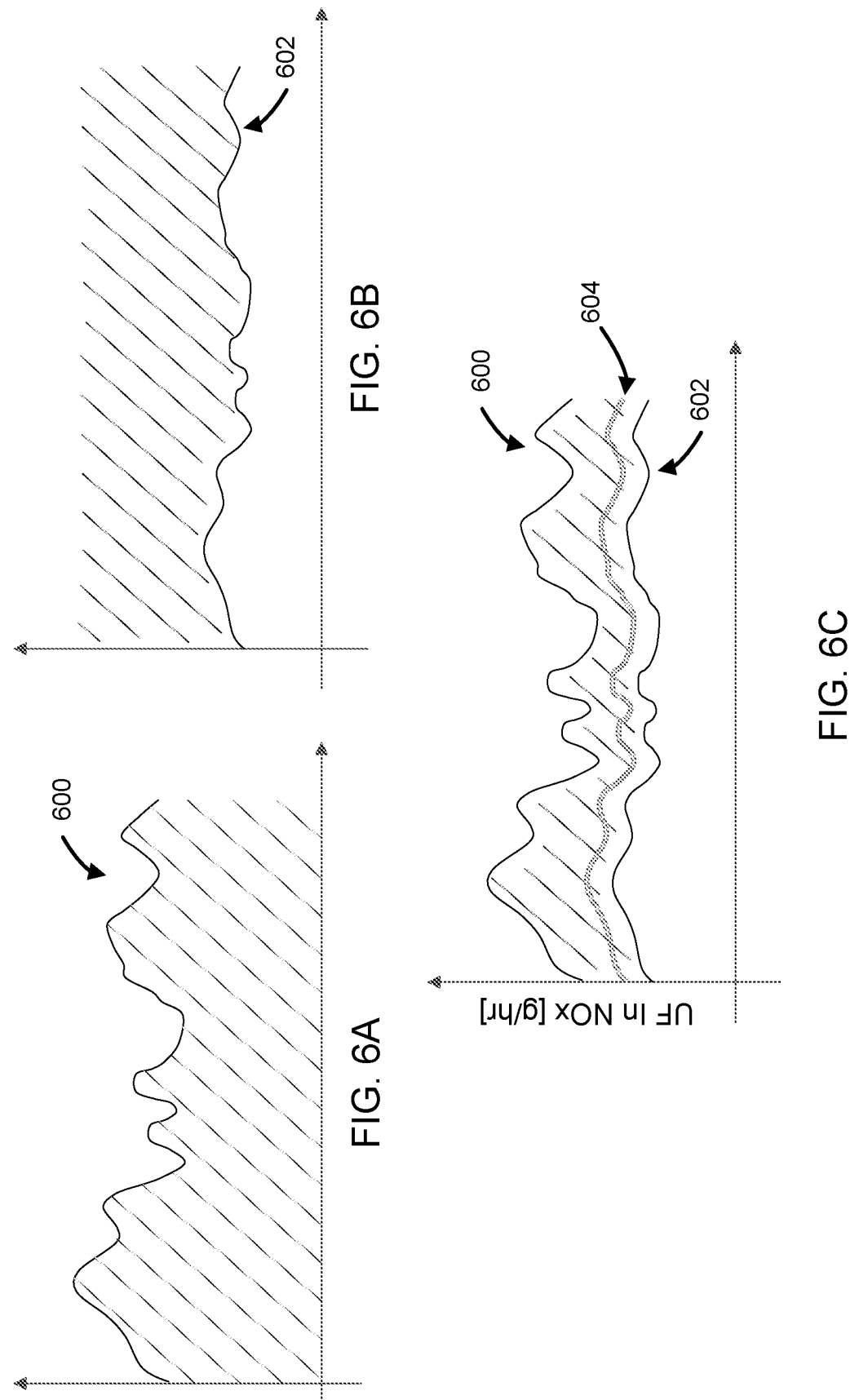
FIGS. 6A-6C are illustrations depicting graphs used for determining a downstream NOx target for the aftertreatment system of FIG. 1, according to an example embodiment.

Referring generally to FIGS. 6A-9D, examples for determining the target ranges and/or target values shown in FIG. 3-5, are shown and described herein below. Referring first to FIGS. 6A-6C, illustrations depicting graphs used for determining the downstream NOx target are shown.

In FIG. 6A, a first graph showing an upper NOx limit 600 for the second SCR 128 is shown. In FIG. 6B, a second graph a lower NOx limit 602 for the DPF 125 is shown. In FIG. 6C, the upper NOx limit 600 and the lower NOx limit 602 are shown on the same graph. Because the upper limit 600 is greater than the lower limit 602, the controller 140 and/or a component thereof (e.g., the aftertreatment control circuit 210) may select a NOx target value 604 that is between the upper limit and the lower limit 602.

Figures 7A, 7B, 7C:
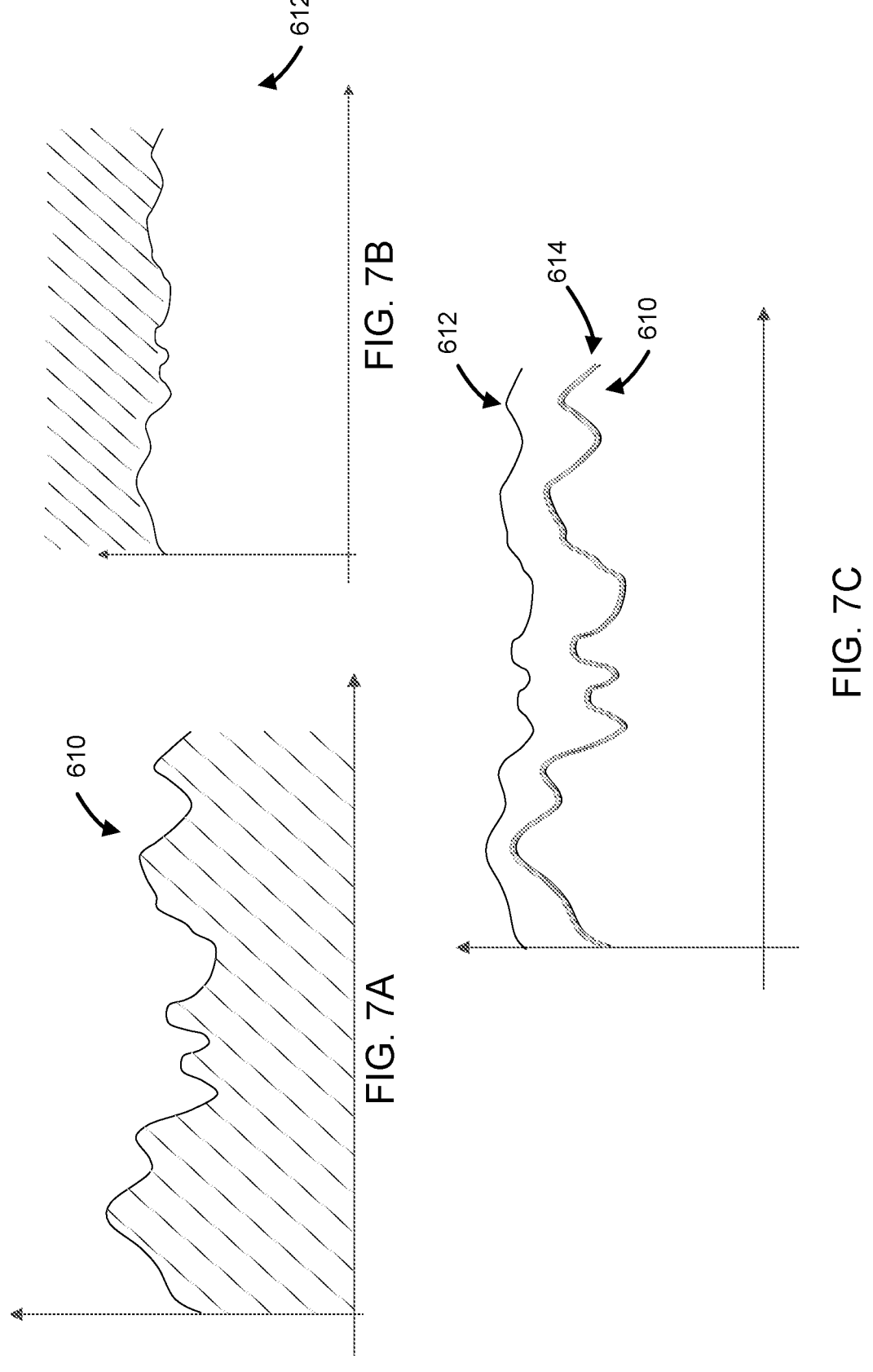
FIGS. 7A-7C are illustrations depicting graphs used for determining a downstream NOx target for the aftertreatment system of FIG. 1, according to an example embodiment.

Referring now to FIGS. 7A-7C, illustrations depicting graphs used for determining the downstream NOx target are shown. In FIG. 7A, a first graph showing an upper NOx limit

610 for the second SCR 128 is shown. In FIG. 7B, a second graph a lower NOx limit 612 for the DPF 125 is shown. In FIG. 7C, the upper NOx limit 610 and the lower NOx limit 612 are shown on the same graph. Because the upper limit 610 is less than the lower limit 612, the controller 140 and/or a component thereof (e.g., the aftertreatment control circuit 210) cannot select a NOx target value that is between the upper limit and the lower limit 602. Instead, the controller 140 may select a NOx target to maximize NOx reduction, unless there are system N2O concerns. In particular, because the lower NOx limit 612 from DPF 125 is greater than upper NOx limit 610 from second SCR 128 (i.e., there is no overlap between these limits), the controller 140 may prioritize the upper NOx limit 610 from second SCR 128 over the lower NOx limit 612 from DPF 125. In particular, the controller 140 may prioritize more efficient NOx reduction by the SCR 128 over passive regeneration of the DPF 125.

Figure 8:
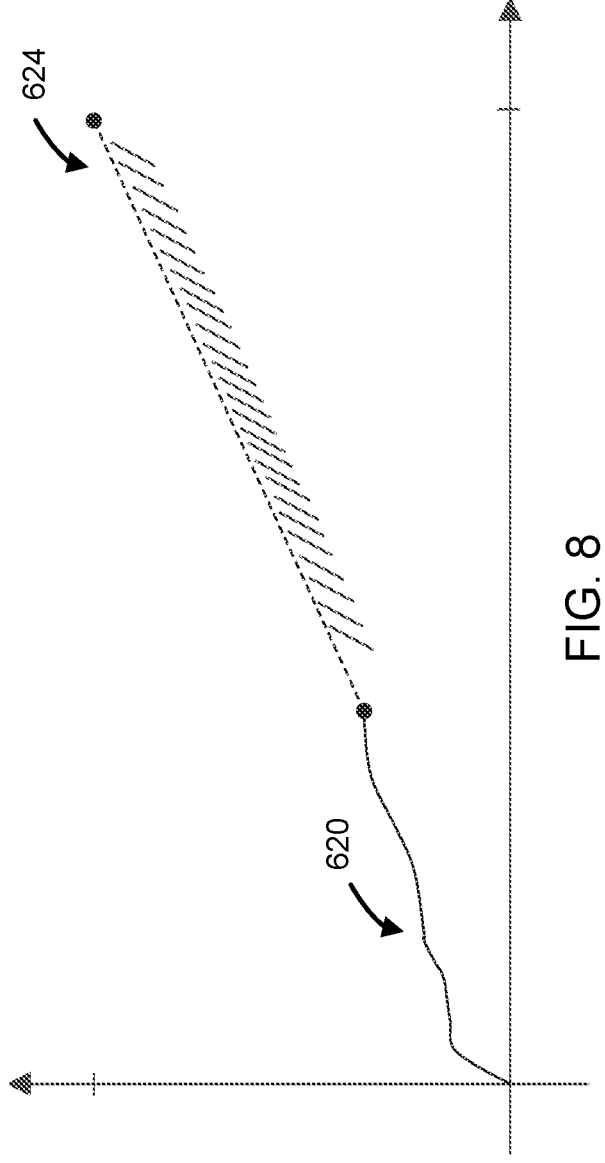
FIG. 8 is an illustration depicting a graph used for determining a soot loading rate for the aftertreatment system of FIG. 1, according to an example embodiment.

Now referring to FIG. 8, an illustration depicting a graph used for determining a soot loading rate of the DPF 125 is shown. In particular, the graph shows an estimated soot load 620 and a maximum soot loading rate 624. The controller 140 and/or a component thereof (e.g., the aftertreatment control circuit 210) may control the aftertreatment system 120 such that the soot loading rate on the DPF 125 is less than the soot maximum soot loading rate 624. The maximum soot loading rate ($SLR_{Max}$) 624 may be determined by equation 1 below.

$$SLR_{Max} = \frac{SL_{Target} - SL_{Current}}{\text{Target Regeneration Interval} - \text{Time Since Last Regneration}} \quad (1)$$

The $SL_{Target}$ value is a target soot load value at which the DPF 125 is regenerated. The $SL_{Current}$ value is the current soot load value. The target regeneration interval is a predetermined time interval between regenerating the DPF 125. The time since the last regeneration is a measure of time since the last regeneration of the DPF 125.

Now referring to FIGS. 9A-9D, various embodiments for determining N2O values are shown. In FIG. 9A, the controller 140 and/or a component thereof (e.g., the aftertreatment control circuit 210) receives inputs including an EONOx value, a first NOx value such as an upstream SCR NOx value (e.g., a NOx value at or proximate the first SCR 122), an upstream catalyst temperature value (e.g., a temperature of the first SCR 122), and a ratio of NO2 to NOx (e.g., a ratio of a NO2 value to a NOx value at or proximate the first SCR 122). The controller 140 may use the inputs with one or more of the sensors 130 (e.g., a virtual sensor) to determine an estimated upstream SCR N2O value (e.g., an estimated N2O value at or proximate the first SCR 122).

In FIG. 9B, the controller 140 and/or a component thereof (e.g., the aftertreatment control circuit 210) receives inputs including an upstream SCR NH3 value (e.g., an NH3 value at or proximate the SCR 122) and a DOC catalyst temperature value (e.g., a temperature of the DOC 124). The controller 140 may use the inputs with one or more of the sensors 130 (e.g., a virtual sensor) to determine an estimated AMOx N2O value (e.g., an estimated N2O value at or proximate the ASC 122*b*).

In FIG. 9C, the controller 140 and/or a component thereof (e.g., the aftertreatment control circuit 210) receives inputs including a system out NOx (SONOx) value (e.g., a NOx value at or proximate an outlet of the aftertreatment system 120), an upstream SCR NOx value, a downstream catalyst temperature value (e.g., a temperature of the second SCR 128), and a ratio of NO2 to NOx (e.g., a ratio of a NO2 value to a NOx value at or proximate the second SCR 128). The controller 140 may use the inputs with one or more of the sensors 130 (e.g., a virtual sensor) to determine an estimated downstream SCR N2O value (e.g., an estimated N2O value at or proximate the second SCR 128).

In FIG. 9D, the controller 140 and/or a component thereof (e.g., the aftertreatment control circuit 210) receives inputs including an upstream NH3 value (e.g., an NH3 value at or proximate the first SCR 122) and a DOC Catalyst temperature (e.g., a temperature of the DOC 124). The controller 140 may use the inputs with one or more of the sensors 130 (e.g., a virtual sensor) to determine an estimated DOC N2O value (e.g., an estimated N2O value at or proximate the DOC 124).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the aftertreatment control circuit may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices.

While the term "processor" is briefly defined above, the term "processor" and "processing circuit" are meant to be broadly interpreted. In some embodiments, the one or more processors may be external to the apparatus (e.g., on-board vehicle controller), for example the one or more processors may be or included with a remote processor (e.g., a cloud-based processor). In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object-oriented programming language such as Java, Smalltalk, C++ or the like and conventional procedural programming languages, such as the "C" programming language or similar programming languages. The computer readable program code may execute entirely on a local computer, partly on the local computer, as a stand-alone computer-readable package, partly on the local computer and partly on a remote computer, etc. In the latter scenario, the remote computer may be connected to the local computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A method of controlling an aftertreatment system comprising:

receiving a first input target and a first input value, the first input target and the first input value associated with a first aftertreatment system component;

receiving a second input target and a second input value, the second input target and the second input value associated with a second aftertreatment system component;

estimating a nitrous oxide value based on at least the first input value and the second input value;

determining a first output target based on at least the first input target, the second input target, and the nitrous oxide value; and controlling the aftertreatment system based on the first output target.

2. The method of claim 1, wherein the first input value is a first sensor value detected by a first sensor, the first sensor associated with the first aftertreatment system component.

3. The method of claim 1, wherein the controlling the aftertreatment system based on the first output target comprises causing a first dosing unit of the aftertreatment system to inject reductant.

4. The method of claim 3, further comprising:

determining a second output target based on at least the first input target, the second input target, and the nitrous oxide value; and controlling the aftertreatment system based on the second output target comprising causing a second dosing unit of the aftertreatment system to inject the reductant.

5. The method of claim 1, further comprising determining a nitrogen oxide target, wherein the determining the nitrogen oxide target comprises:

determining a nitrogen oxide range via a nitrogen oxide response model based on a first set of inputs regarding at least the first aftertreatment system component and the second aftertreatment system component;

determining the estimated nitrous oxide value based on a second set of inputs regarding at least the first aftertreatment system component and the second aftertreatment system component;

determining a nitrous oxide range via a nitrous oxide response map based on a third set of inputs including at least the nitrogen oxide range and the estimated nitrous oxide value; and determining the nitrogen oxide target based on the nitrous oxide range, wherein at least one of the first input target or the second input target is the nitrogen oxide target.

6. The method of claim 1, further comprising:

receiving a first engine value associated with an engine upstream of the aftertreatment system; and determining an engine output target based on the first engine value based on at least one of the first input target, the second input target, or the nitrous oxide value.

7. The method of claim 1, wherein the controlling the aftertreatment system based on the first output target comprises causing a heater to heat at least one of the first aftertreatment system component or the second aftertreatment system component, wherein the first output target is a temperature target.

8. The method of claim 1, wherein the controlling the aftertreatment system based on the first output target comprises causing a hydrocarbon doser to inject hydrocarbons into the aftertreatment system, wherein the first output target is a temperature target.

9. The method of claim 8, wherein the hydrocarbon doser injects the hydrocarbons into the aftertreatment system downstream of the first aftertreatment system component and upstream of the second aftertreatment system component.

10. The method of claim 9, wherein the estimated nitrous oxide value is at least one of a first estimated nitrous oxide value or a second estimated nitrous oxide value;

wherein the first estimated nitrous oxide value is determined at or proximate to the first aftertreatment system component based on at least an engine out nitrogen oxide value, a first nitrogen oxide value at or proximate an outlet of the first aftertreatment system component, and a temperature of the first aftertreatment system component; and wherein the second estimated nitrous oxide value is determined at or proximate to the second aftertreatment system component based on a nitrogen oxide value at or proximate an outlet of the aftertreatment system, the first nitrogen oxide value at or proximate the first aftertreatment system component, and a temperature of the second aftertreatment system component.

11. A system, comprising:

an aftertreatment system comprising at least a first component and a second component;

a controller coupled to the aftertreatment system, the controller comprising at least one processor and at least one memory device storing instructions therein that, when executed by the at least one processor, cause the controller to perform operations comprising:

receiving a first input target and a first input value, the first input target and the first input value associated with the first component;

receiving a second input target and a second input value, the second input target and the second input value associated with the second component;

receiving a nitrous oxide value based on at least the first input value and the second input value;

determining a first output target based on at least the first input target, the second input target and the nitrous oxide value; and controlling the aftertreatment system based on the first output target.

12. The system of claim 11, wherein the controlling the aftertreatment system based on the first output target comprises causing a first dosing unit of the aftertreatment system to inject reductant.

13. The system of claim 12, wherein the operations further comprise:

determining a second output target based on at least the first input target, the second input target, and the nitrous oxide value; and controlling the aftertreatment system based on the second output target comprising causing a second dosing unit of the aftertreatment system to inject the reductant.

14. The system of claim 11, wherein the operations further comprise determining a nitrogen oxide target, wherein the determining the nitrogen oxide target comprises:

receiving a nitrogen oxide range via a nitrogen oxide response model based on a first set of inputs regarding at least the first component and the second component;

receiving an estimated nitrous oxide value, wherein the estimated nitrous oxide value is based on a second set of inputs regarding at least the first component and the second component;

receiving a nitrous oxide range via a nitrous oxide response map and based on a third set of inputs including at least the nitrogen oxide range and the estimated nitrous oxide value; and receiving the nitrogen oxide target based on the nitrous oxide range, wherein at least one of the first input target or the second input target is the nitrogen oxide target.

15. The system of claim 11, further comprising an engine disposed upstream of the aftertreatment system;

wherein the operations further comprise:

receiving a first engine value associated with the engine; and determining an engine output target based on the first engine value based on at least one of the first input target, the second input target, or the nitrous oxide value.

16. The system of claim 11, wherein controlling the aftertreatment system based on the first output target comprises causing a heater to heat at least one of the first component or the second component, wherein the first output target is a temperature target.

17. The system of claim 11, wherein the aftertreatment system comprises a hydrocarbon doser disposed between the first component and the second component; and wherein controlling the aftertreatment system based on the first output target comprises causing the hydrocarbon doser to inject hydrocarbons into the aftertreatment system.

18. A non-transitory computer readable medium storing instructions therein that, when executed by one or more processors, cause the one or more processors to perform operations comprising:

receiving a first input target and a first input value, the first input target and the first input value associated with a first component;

receiving a second input target and a second input value, the second input target and the second input value associated with a second component;

receiving a nitrous oxide value;

determining a first output target based on at least the first input target, the second input target and the nitrous oxide value; and controlling an aftertreatment system based on the first output target.

19. The non-transitory computer readable medium of claim 18, wherein the controlling the aftertreatment system based on the first output target comprises causing a first dosing unit of the aftertreatment system to inject reductant.

20. The non-transitory computer readable medium of claim 18, wherein the operations further comprise determining a nitrogen oxides target, wherein the determining the nitrogen oxides target comprises:

receiving a nitrogen oxide range via a nitrogen oxide response model and based on a first set of inputs regarding at least the first component and the second component;

receiving an estimated nitrous oxide value based on a second set of inputs regarding at least the first component and the second component;

receiving a nitrous oxide range via a nitrous oxide response map and based on a third set of inputs including at least the nitrogen oxide range and the estimated nitrous oxide value; and receiving the nitrogen oxides target based on the nitrous oxide range, wherein at least one of the first input target or the second input target is the nitrogen oxides target.

* * * * *